United States Patent Office 2,740,257
Patented Apr. 3, 1956

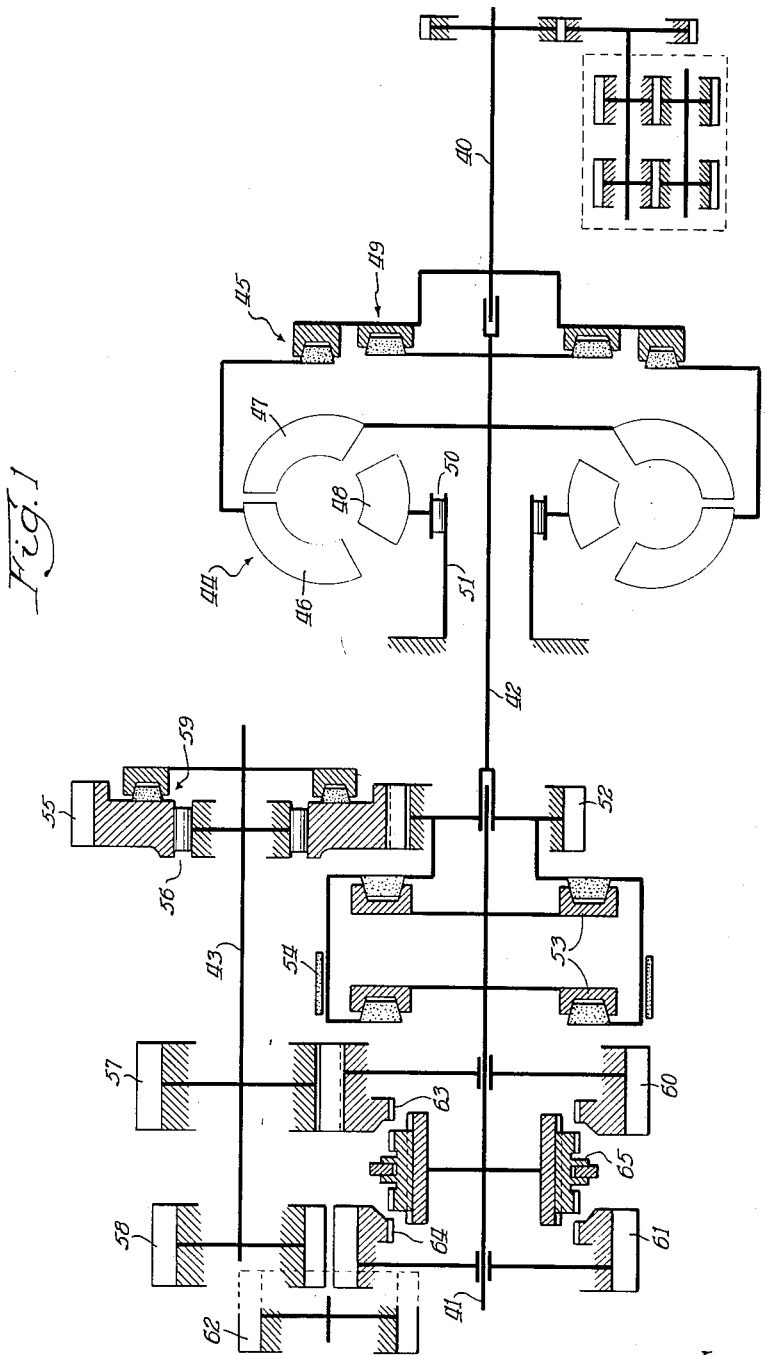

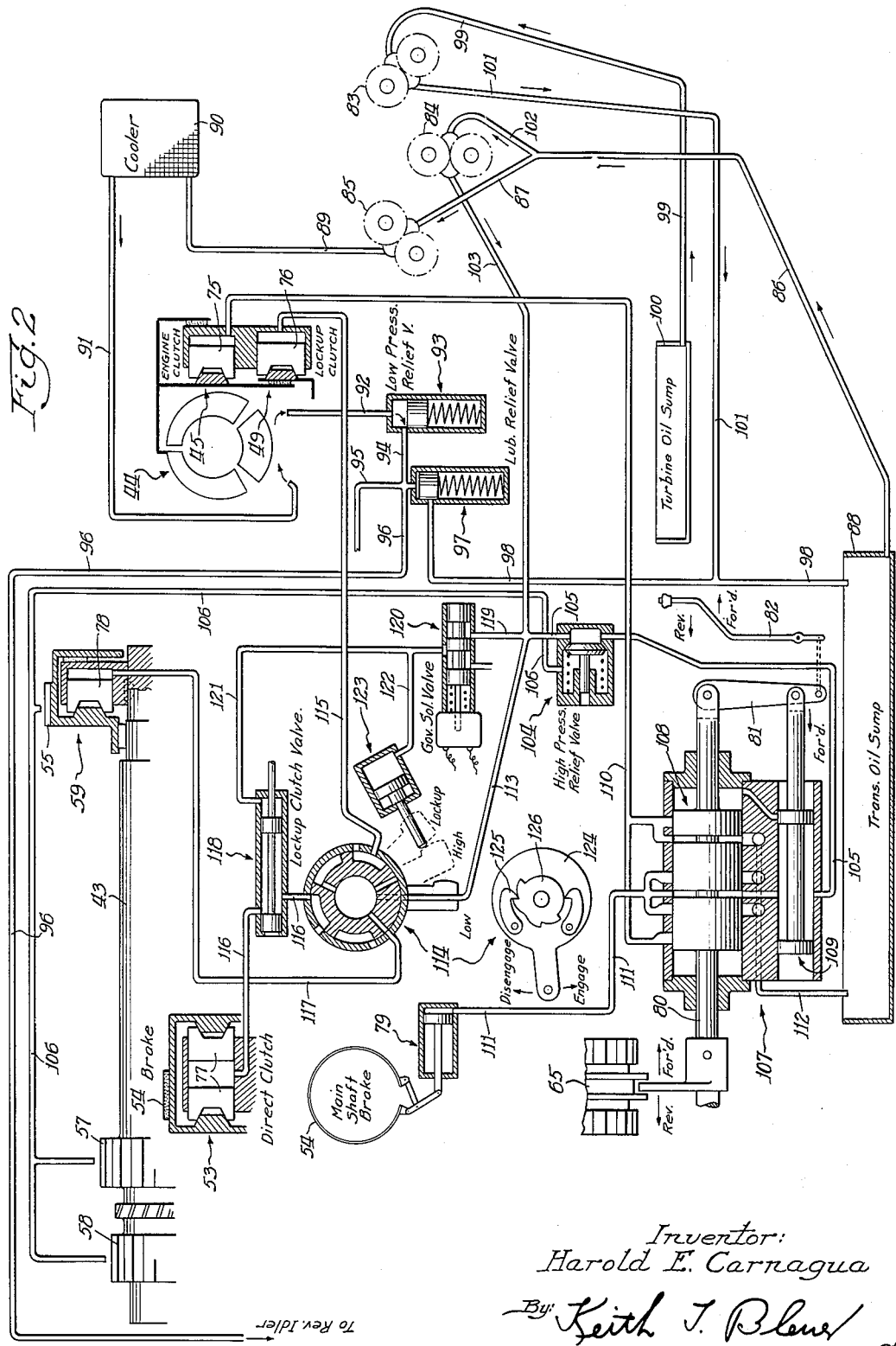

2,740,257

HYDRODYNAMIC TYPE TRANSMISSION AND CONTROL MECHANISM THEREFOR

Harold E. Carnagua, Muncie, Ind., assignor to Borg-Warner Corporation, Chicago, Ill., a corporation of Illinois Original application May 10, 1943, Serial No. 486,293, now Patent No. 2,619,848, dated December 2, 1952. Divided and this application November 17, 1952, Serial No. 320,967

2 Claims. (Cl. 60—54)

My invention relates to transmissions for engine driven vehicles and hydraulic control mechanism for the transmissions.

It is an object of my invention to provide improved hydraulic controls for a vehicle transmission which comprises a hydrodynamic power transmitting device for gradually starting the vehicle from rest and power operated clutches which are selectively engaged for providing different drives through the transmission.

More particularly, it is an object of the invention to provide an improved fluid pressure regulating system supplying fluid under a number of different pressures suitable for different uses within the transmission. More specifically, it is an object to provide a fluid pump, a relief valve for maintaining the pressure of fluid discharged by the pump at a predetermined value and having a discharge port, the pressure of fluid as so regulated by the relief valve being suitable for one use in the transmission, and a second relief valve connected with the discharge port for maintaining the pressure discharged from the port at a predetermined value which is less than the first-named value of pressure, the latter reduced fluid pressure being suitable for a different use in the transmission.

This application is a divisional application with respect to my application for transmission and control mechanism therefor, Serial No. 486,293, filed May 10, 1943, now Patent No. 2,619,848, issued Dec. 2, 1952.

My invention consists of the novel constructions, arrangements and devices to be hereinafter described and claimed for carrying out the above-stated objects and such other objects as will appear from a detailed description of a certain preferred embodiment illustrated in the accompanying drawings wherein:

Fig. 1 is a view showing diagrammatically a transmission with which my improved control system may be used; and Fig. 2 is a view showing diagrammatically an improved hydraulic control system for the transmission illustrated in Fig. 1.

Like characters of reference designate like parts in the several views.

Referring to the schematic illustration of the transmission shown in Fig. 1 my improved transmission comprises an input shaft 40, an output shaft 41, an intermediate shaft 42, and a countershaft 43. Functionally, as will hereinafter appear, the intermediate shaft 42 constitutes an output shaft with respect to the shaft 40 and an input shaft with respect to the shaft 41. A hydrodynamic coupling device 44, which is preferably of the torque converter type, is adapted to be driven by the shaft 40 by means of a clutch 45. The torque converter comprises a driving element 46 connected with the clutch 45, a driven element 47 connected with the shaft 42, and a stator element 48. A clutch 49 is provided for connecting directly the input shaft 40 and the intermediate shaft 42 and for locking up the driving element 46 and the driven element 47 of the converter 44 when the clutch 45 is engaged. The stator element 48 is connected by means of a one-way brake mechanism 50 with a stationary shaft 51, and the brake mechanism 50 is of such construction as to prevent reverse rotation of the element 48.

The intermediate shaft 42 has fixed thereon a gear 52, and a clutch 53 is provided for connecting directly the intermediate shaft and the output shaft 41. A brake 54 is provided for restraining the rotation of the shaft 42 and driven element 47. A gear 55 in mesh with gear 52 is disposed on the countershaft 43 and is connected therewith by a one-way clutch mechanism 56, and spaced gears 57 and 58 are fixed on the countershaft. A clutch 59 is provided for locking up the one-way clutch mechanism 56. Gears 60 and 61 are rotatably disposed on the output shaft 41 with gear 60 in mesh with gear 57 and gear 61 in mesh with an idler gear 62 which in turn meshes with gear 58. Clutch teeth 63 and 64 are provided on the gears 60 and 61 respectively, and a grooved clutch sleeve 65 is slidably and non-rotatably disposed with respect to shaft 41 and is adapted to interengage with either the teeth 63 or 64.

The transmission may be controlled to provide three speed ratios in forward drive and one speed in reverse. The lowest or first speed forward is obtained when the clutches 45 and 59 and the positive clutch comprising teeth 63 and the member 65 are engaged, and the clutches 49 and 53 are disengaged. Second or intermediate speed forward is thereafter obtained by engaging the clutch 53 and disengaging the clutch 59 to couple directly the shafts 42 and 41. Third or high speed forward is obtained by thereafter engaging the clutch 49 to lock up the torque converter 44. An auxiliary intermediate speed may be obtained if desired with clutch 49 engaged and with the clutch sleeve 65 engaged with teeth 63 and with the clutches 45 and 59 either engaged or disengaged. Reverse may be obtained by engaging the clutch member 65 with the teeth 64, with the clutches 45 and 59 engaged and with the clutches 49 and 53 disengaged.

Fig. 2 of the drawings will be referred to particularly for a description of the control mechanism for the transmission. The clutches 45, 49, 53 and 59 shown in Fig. 1 are, in the control arrangement illustrated, each actuated by fluid pressure operated piston means with the piston means 75, 76, 77 and 78 operating to engage respectively the clutches 45, 49, 53 and 59. The brake 54 is also fluid pressure actuated, a piston mechanism 79 being employed for this purpose. The clutch sleeve 65 is movable with a shaft 80, which in turn is pivotally connected with and is movable with a lever 81. The lever 81 is connected and is movable with a pair of manual control levers 82.

Three pumps 83, 84 and 85 are provided and each is driven by the input shaft 40 of the transmission. The pump 85 functions to draw fluid, preferably oil, through conduits 86 and 87 from a sump 88 for the transmission, and the pump forces the oil through conduit 89 to a cooler 90 and from the cooler through conduit 91 to the hydrodynamic coupling device 44. The pump forces the oil to circulate through the hydrodynamic device and out of the device through a conduit 92 to a low pressure relief valve 93 and from the latter valve through a conduit 94 to conduits 95 and 96 and lubricant relief valve 97. The relief valve 93 functions to connect the conduits 92 and 94, after the oil pressure in the coupling 44 and the conduit 92 has reached a predetermined value, and the relief valve functions to maintain the pressure in the coupling at substantially this value. The relief valve 97 has a conduit 98 connected therewith which leads to the sump 88, and the valve 97 functions to connect conduits 94 and 98 when the oil pressure in conduit 94 has reached a predetermined value and to maintain the oil pressure in the conduits 95 and 96 at this predetermined value. The conduit 95 is connected with the output shaft 41 to lubricate parts movable relative thereto, and the conduit 96 is connected with the countershaft 43 to lubricate parts movable relative thereto.

The pump 83 is connected to draw oil through a conduit 99 from the oil sump 100 for the hydrodynamic device 44 and to discharge oil through conduits 101 and 98 into the oil sump 88. The pump 83 thus functions to transfer oil which may leak from the hydrodynamic device 44 into the sump 100 to the main sump 88 of the transmission.

The pump 84 is connected to draw oil from the sump 88 through conduits 86 and 102 and to discharge oil under pressure into a conduit 103. The oil pressure in the conduit 103 is maintained at a predetermined value by means of a high pressure relief valve 104 which is connected in conduit 105 which in turn is connected with conduit 103. The valve 104 has a conduit 106 connected therewith, and the valve functions to discharge through this conduit a portion of the oil discharged by the pump 84 through the conduit 103 when the oil pressure in conduit 103 reaches this predetermined value. The conduit 106 is provided with outlets adjacent the gears 55, 57 and 58 whereby the oil which flows through the conduit 106 discharges on to the teeth of the gears for lubricating the teeth.

The conduit 105 is connected with a valve mechanism 107 which comprises valves 108 and 109. The valve 108 is formed on the shaft 80 which is pivotally connected with the lever 81 and which acts on movement thereof to move the clutch sleeve 65. The valve 109 is pivotally connected with the lever 81 adjacent its lower end, as seen in Fig. 2, which is connected with the control levers 82. The valve mechanism is connected by means of a conduit 110 with the engine clutch 45 and is connected by means of a conduit 111 with the brake actuating piston mechanism 79. A conduit 112 arranged to discharge oil into the sump 88 is connected with the valve mechanism as shown.

The valve mechanism 107 as shown in Fig. 2 is in its neutral condition. In this condition of the mechanism, the valve 108 operates to bleed oil from the engine clutch 45 through the conduits 110 and 112 to the sump 88 for disengaging the clutch, and the valve 108 provides a passage between conduits 105 and 111 for engaging the brake 54 for restraining rotation of the driven element 47 of the converter 44.

When the lower end of the lever 81 is moved by means of the control levers 82 to the left as seen in Fig. 2, the valve 109 is moved to the left and opens a passage in the mechanism to allow oil under pressure to flow to the left end of the valve 108. The valve 108 is thereby moved to the right for shifting the clutch sleeve 65 also to the right. However, any such movement of the valve 108 also causes movement of the valve 109 in the same direction by means of link 81 whereby the latter valve covers the passage for admitting fluid under pressure at the left end of the valve 108. Movement of the valve 109 by means of lever 81 thus controls movement of the valve 108 and sleeve 65, and the sleeve may be moved as slowly as desired by power means but under manual control for engaging it with teeth 63. When the sleeve 65 has been moved to fully engage the teeth thereon with the teeth 63, the valve 108 is in a position uncovering an inlet of the conduit 110 whereby fluid under pressure is admitted to the conduit to engage the engine clutch 45. The valve 108 in this position also provides a passage between conduits 111 and 112 whereby the oil is drained from the conduit 111 to disengage the brake 54. The valve mechanism 107 thus functions when in neutral condition to maintain engaged the brake 54 and when conditioned for forward drive, to engage the engine clutch 45 and to engage teeth on the sleeve 65 with the teeth 63. The lower end of the lever 81 may be moved to the right as seen in Fig. 2 to condition the valve mechanism 107 for reverse, and when the mechanism is so conditioned, the engine clutch 45, the brake 54 and the sleeve 65 are actuated in substantially the same manner as when the mechanism is conditioned for forward except that the sleeve 65 is engaged instead with the teeth 64.

The conduit 103 is connected with a conduit 113 which in turn is connected with a valve 114. Conduits 115, 116 and 117 are also connected with the valve 114, and these conduits connect the valve respectively with the clutch 49, the clutch 53 and the clutch 59. A valve 118 adapted for manual operation is provided in the conduit 116 for closing the conduit when desired.

The valve 114 has three positions: low, high and lock-up positions. In the low position of the valve, in which it is shown in Fig. 2, the conduit 113 is connected by the valve with the conduit 117 for applying fluid pressure to the clutch 59 for engaging the clutch. The valve 114 in this position also functions to "bleed" the conduits 115 and 116, that is to say, the valve allows any fluid in the conduits to freely drain therefrom, for maintaining disengaged the clutches 49 and 53. In the second or high position of the valve 114, which is indicated in the figure, the valve functions to bleed the conduits 115 and 117 for maintaining the clutches 49 and 59 disengaged, and the valve also functions to connect the conduits 113 and 116 for applying fluid pressure to the clutch 53 for engaging the latter clutch. In the third or lock-up position of the valve 114, the valve functions to bleed the conduit 117 for maintaining disengaged the clutch 59, and the valve functions also to connect the conduits 115 and 116 each with the conduit 113 for applying fluid pressure to the clutches 49 and 53 for engaging the latter clutches. The clutch 49 may be engaged while the clutch 53 is disengaged by moving the valve 118 to block the conduit 116 and then moving the valve 114 from its first to its third position.

A conduit 119 is provided to connect a valve 120 with the conduit 103. A conduit 121 connects the valves 118 and 120, and a conduit 122 connects a fluid pressure operated piston mechanism 123 with the conduit 121. The valve 120 is actuated by a solenoid and the valve 120 functions in one position to connect the conduits 119 and 121 and in another position to bleed the conduit 121. The piston mechanism 123 operates when the valve 120 connects the conduits 119 and 121 to move the valve 114 from its lock-up position, if it is in that position, to its high or second position, and the valve 118 is moved from its position closing the conduit 116, if it is in that position, to a position opening the conduit 116 when the valve 120 operates to connect the conduits 119 and 121.

The valve 114 is adapted to be actuated by means of a member 124. The member 124 has a pawl mechanism 125 fixed thereto which is adapted to cooperate with ratchet wheel 126 fixed with respect to the rotatable parts of the valve 114. By means of the ratchet wheel and pawl mechanism, the member 124 on being moved successively counterclockwise successively moves the valve 114 from its low to its high and then to its lock-up position, and the member 124 on being moved successively clockwise successively moves the valve from its lock-up to its high and then to its low position.

The low pressure relief valve 93 effectively regulates the fluid pressure within the torque converter 44 with the spring pressed piston in the low pressure relief valve 93 opening the passage 94 just sufficiently so as to maintain a predetermined pressure within the torque converter 44. The fluid pressure in the passage 94 is maintained at a predetermined lower pressure by means of the spring pressed piston in the relief valve 97 which releases just sufficient fluid from the passage 94 into the conduit 98 so as to maintain the pressure in the passage 94 at the predetermined lower value. The passage 94, is connected with the conduits 95 and 96, which, as has been previously described, are connected to lubricate various parts in the transmission.

I wish it to be understood that my invention is not to be limited to the arrangements and constructions shown and described except only insofar as the claims may be so limited, as it will be apparent to those skilled in the art that changes may be made without departing from the principles of the invention.

I claim:

1. In a power transmission mechanism, the combination of a hydrodynamic coupling device utilizing fluid under pressure for providing a drive therethrough and other drive transmitting mechanism requiring lubrication, a source of lubricating fluid, a pump for said fluid and connected with said hydrodynamic device for supplying fluid under pressure thereto, said hydrodynamic device having an outlet, a pressure relief valve connected with said outlet and having a discharge port, said relief valve maintaining the pressure of the fluid in said hydrodynamic device at a predetermined value, and a second relief valve connected with said discharge port and maintaining the pressure of fluid discharged from said port at some predetermined value less than the pressure of fluid in said hydrodynamic device, said other drive transmitting mechanism being connected with said discharge port for lubricating the latter mechanism.

2. In a power transmission mechanism, the combination of a hydrodynamic coupling device utilizing fluid under pressure for providing a drive therethrough and other drive transmitting mechanism requiring lubrication, a source of lubrication fluid comprising a sump, a pump for said fluid connected with said hydrodynamic device for supplying fluid under pressure thereto, said hydrodynamic device having an outlet, a pressure relief valve connected with said outlet having a discharge port, means connecting said outlet and said relief valve whereby said relief valve maintains the pressure of the fluid in said hydrodynamic device at a predetermined value, a second relief valve connected with said discharge port maintaining the pressure of fluid discharged from said port at a second predetermined value less than the pressure of fluid in said hydrodynamic device, means for transmitting fluid between said discharge port and said other drive mechanism for lubricating said other drive mechanism, and means for transmitting fluid between said second relief valve and said sump.

References Cited in the file of this patent

UNITED STATES PATENTS

| | | |
|---|---|---|
| 2,186,748 | Berger | Jan. 9, 1940 |
| 2,343,304 | La Brie | Mar. 7, 1944 |

FOREIGN PATENTS

| | | |
|---|---|---|
| 493,553 | Great Britain | Oct. 11, 1938 |